(No Model.)
G. W. KNAPP.
MEANS FOR ATTACHING HANDLES TO SHEET METAL WARE.
No. 304,938. Patented Sept. 9, 1884.
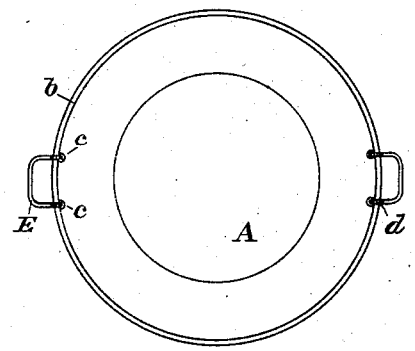
Fig. 1.
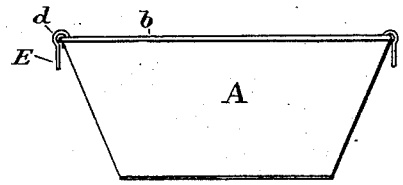
Fig. 2.
Fig. 3.
Fig. 4.
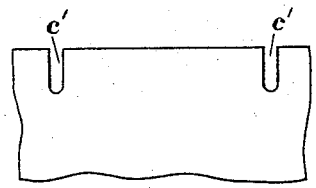
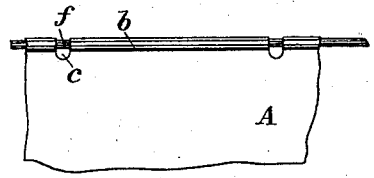
Fig. 5.
Fig. 6.
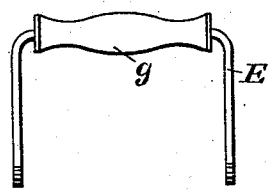
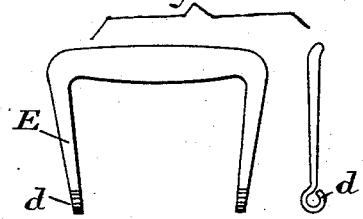
WITNESSES:
A. C. Eader
John E. Morris
INVENTOR:
Geo. W. Knapp
By Chas B. Mann
Attorney.

UNITED STATES PATENT OFFICE.

GEORGE W. KNAPP, OF BALTIMORE, MARYLAND.

MEANS FOR ATTACHING HANDLES TO SHEET-METAL WARE.

SPECIFICATION forming part of Letters Patent No. 304,938, dated September 9, 1884.

Application filed May 17, 1884. (No model.)

*To all whom it may concern:*

Be it known that I, GEORGE W. KNAPP, a citizen of the United States, residing at Baltimore, in the State of Maryland, have invented certain new and useful Improvements in Means for Attaching Handles to Sheet-Metal Ware, of which the following is a specification.

My invention relates to an improvement in attaching handles to sheet-metal pans; and it consists of a handle attached directly to the wire in the top rim of the pan without the intervention of rivets or solder.

In the drawings hereto annexed, Figure 1 is a top view of a pan with the handle. Fig. 2 is a side view of same. Figs. 3 and 4 show how the handle-holes are formed, whereby the hooks of the handle may take direct hold on the wire in the top rim. Figs. 5 and 6 show modifications of the handle.

The letter A designates a sheet-metal pan of any desired shape or construction, having its top rim, $b$, coiled or turned over substantially in the ordinary manner, and inclosing the wire $f$. The handle E has two hooks, $d$—one at each end—which take hold of the said wire $f$. This is effected, as shown in Figs. 3 and 4, by cutting slots $c'$ in the upper edge of the wall of the pan before said edge is wired, and then when the slotted edge is coiled or turned over to inclose the wire each slot forms a hole, $c$, which allows the hooks $d$ to pass through the wall below the wire $f$, and take direct hold on said wire. As the slot $c'$ may be cut by the same punch and die, and at same stroke of the punch which cuts the blank that forms the pan-wall, it will be seen that in manufacturing the pans the holes $c$ will be located uniformly, and will always afford exactly the same space below the wire $f$.

The handle E may be made of wire, (see Figs. 1 and 2,) as the cheapest manner of constructing it, and it may have a wood grip part, $g$, as shown in Fig. 5; or, instead of being made of wire, it may be cut by a die from sheet iron to any suitable shape—as, for example, like that shown in Fig. 6, and may be painted or galvanized.

A handle attached as the one described is adapted for different kinds of pans, which may be shaped either round, oval, or square. Besides being cheap, the handle is strongly attached, easy on the wall of the pan, and not in the way when packing the pan or at other times, like rigidly-attached handles are. It will be seen that neither rivets or solder are employed in the attachment of the handle.

Having described my invention, I claim—

A sheet-metal pan having its top rim wired and provided with holes which expose said wire, and a handle attached directly to the wire, as set forth.

In testimony whereof I affix my signature in presence of two witnesses.

GEORGE W. KNAPP.

Witnesses:
JOHN E. MORRIS,
CHAS. B. MANN.